UNITED STATES PATENT OFFICE.

No. 298,505

LOUIS ROSENTHAL, OF FRANKFORT-ON-THE-MAIN, GERMANY.

MAKING ARTIFICIAL BLOCKS, STONES, &c.

SPECIFICATION forming part of Letters Patent No. 298,505, dated May 13, 1884.

Application filed March 25, 1884. (No specimens.)

*To all whom it may concern:*

Be it known that I, LOUIS ROSENTHAL, a subject of the Emperor of Germany, and residing at Frankfort-on-the-Main, Germany, have invented new and useful Improvements in Making Artificial Blocks, Stones, and the Like, especially Artificial Lithographic Stones, of which the following is a specification.

Among the great disadvantages that artificial stones made from cement possess is foremost the cracking of the material in hardening in consequence of shrinkage. This difficulty is partly overcome by mixing the cement with sand; but the resulting product is only applicable for ordinary purposes—such as plastering walls, making building-blocks, &c.—but not for surfaces that are to be polished or receive a fine finish, as the varying hardness of the silica prevents giving the surface a polish.

The object of my invention is to provide a new and improved artificial stone devoid of the above-mentioned defects.

In carrying out my invention I proceed as follows: One-half, or more or less, of the quantity of cement used is made into a paste with water, and formed into thin plates, which are hardened as quickly as possible, if necessary, by means of heat. Before the plates are hardened perfectly, they are moistened with water and again heated, and so on until they are full of cracks, owing to the sudden changes in the temperature. The plates thus prepared and treated are then ground to a fine powder, which is mixed with the remaining portion of cement to form a paste or mortar. If desired, powdered carbonate of lime can be used in place of the powder obtained from the hardened cement plates. The paste is cast or pressed into a mold of any desired shape made from cast-iron, and divided into two compartments by a perforated plate placed horizontally, and covered with a linen cloth. On this plate the material is permitted to dry, and is then subjected to a pressure of twenty atmospheres. A sufficient quantity of water is poured over the mass to produce a hardening of the mass, and this water is sucked through the mass by means of an air-pump or other apparatus placed under the perforated plate. By this operation all the air is expelled from the mass and replaced by the fluid. This mass is then again subjected to a pressure of twenty atmospheres, by which the excess of water is expelled and the molecules of the mass approach each other very closely. The mass or block is then further condensed by means of water holding in solution alkaline soluble parts of cement. The water is preferably prepared in the following manner: Cement is mixed with one hundred per cent. of water, and by constant agitation hardening is prevented until a fine sludge is formed which has the appearance of finely-slaked lime, and then the water which holds the soluble parts of the cement in solution is drawn off. The water is forced through the solidified and hardened stone, and thereby the most microscopically-small apertures in the block are filled in by the soluble constituents of the cement contained in the water. This manipulation may be repeated as often as is necessary after the block has become dry.

Stones thus prepared are equal in quality to the natural lithographic stone, and the lines produced by means of the same are sharper and clearer than the lines produced by natural lithographic stones.

The above-described stone does not absorb water. It can be polished to a certain degree, and requires no treatment in regard to the application of colors. It can be molded into any suitable shape, such as rollers, slabs, &c.

The ordinary cement can be mixed with the powdered hardened cement or carbonate of lime before making the paste; or the powdered hardened cement or the carbonate of lime can be mixed with the cement-paste before the same has become set. If the mass is to have a white or whitish color, the carbonate of lime is used.

Having thus described my invention, and the manner of employing the same, I claim—

1. The preparation, as herein described, of a cast mass of cement made by mixing fresh unset cement with an equal quantity, or rather more, of cement which has already become hardened, (set,) or of finely-ground carbonate of lime, which mass is free from cracks or faults.

2. The preparation of artificial lithographic stones or rollers from cement by mixing unset cement with about an equal quantity of already-set cement finely powdered, or, in lieu thereof, with finely-powdered carbonate of lime, then drying this mixture, pressing it together under a high pressure, sucking a quantity of water necessary for its hardening or setting through it, and finally again subjecting the moist mass to a high pressure, substantially as herein specified.

3. The impregnation of cement stones, rollers, or other formed objects with a liquid saturated with the alkaline and soluble constituents of cement (prepared by stirring cement up with water and pouring off the liquid) until the objects under preparation, by merely grinding, (without the aid of polishing mediums,) show a polish, all substantially in the manner and for the purpose as described.

In testimony whereof I have signed my name to this specification in the presence of two subscribing witnesses.

LOUIS ROSENTHAL.

Witnesses:
FRANZ HASSLACHER,
JOSEPH PATRICK.